(12) United States Patent
Pomparew et al.

(10) Patent No.: US 11,780,380 B2
(45) Date of Patent: Oct. 10, 2023

(54) REAR VIEW DEVICE AND VEHICLE HAVING SUCH A REAR VIEW DEVICE

(71) Applicant: MOTHERSON INNOVATIONS COMPANY LIMITED, London (GB)

(72) Inventors: Hans-Dieter Pomparew, Stuttgart (DE); Arne Schmierer, Stuttgart (DE); Stefan Andrei, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 154 days.

(21) Appl. No.: 17/258,986

(22) PCT Filed: Jul. 11, 2019

(86) PCT No.: PCT/EP2019/068683
§ 371 (c)(1),
(2) Date: Jan. 8, 2021

(87) PCT Pub. No.: WO2020/011923
PCT Pub. Date: Jan. 16, 2020

(65) Prior Publication Data
US 2021/0300262 A1  Sep. 30, 2021

(30) Foreign Application Priority Data
Jul. 11, 2018  (DE) ..................... 10 2018 116 836.5

(51) Int. Cl.
*B60R 11/04* (2006.01)
*B60R 1/12* (2006.01)
*B60R 11/00* (2006.01)

(52) U.S. Cl.
CPC ....... *B60R 11/04* (2013.01); *B60R 2001/1253* (2013.01); *B60R 2011/004* (2013.01);
(Continued)

(58) Field of Classification Search
CPC ............ B60R 11/04; B60R 2001/1253; B60R 2011/004; B60R 2011/0087; B60R 2011/0092; B60R 2300/8046
See application file for complete search history.

(56) References Cited

U.S. PATENT DOCUMENTS 6,239,928 B1 * 5/2001 Whitehead .............. B60R 1/078
359/872
2017/0280111 A1 * 9/2017 Henion .................... B60R 11/04

FOREIGN PATENT DOCUMENTS

DE  3136840 A1  3/1983
DE  3440477 A1  5/1986
(Continued)

OTHER PUBLICATIONS

International Search Report dated Sep. 13, 2019 of International application No. PCT/EP2019/068683.
(Continued)

*Primary Examiner* — Howard D Brown, Jr.
*Assistant Examiner* — Tyler B Edwards
(74) *Attorney, Agent, or Firm* — Jones Day

(57) ABSTRACT

A rearview device for a vehicle (17) includes at least one sensor for detecting information of the environment of the vehicle, where the rearview device is attachable to the supporting structure of the vehicle by using at least one first fastening device, and the rearview device includes at least one arm which is rotatably mounted by the first fastening device about at least one first axis of rotation which has at least one vertical component about at least one first pivot point for a first rotation.

30 Claims, 9 Drawing Sheets

(52) U.S. Cl.
    CPC ............... *B60R 2011/0087* (2013.01); *B60R 2011/0092* (2013.01); *B60R 2300/8046* (2013.01)

(56) References Cited

FOREIGN PATENT DOCUMENTS

| | | | |
|---|---|---|---|
| DE | 102012015395 B3 | 11/2013 | |
| DE | 102017002578 A1 | 9/2018 | |
| EP | 2955065 A1 | 12/2015 | |
| EP | 3254902 A1 * | 12/2017 | ............... B60R 1/00 |
| EP | 3254902 A1 | 12/2017 | |
| WO | WO 2017/177205 A | 10/2017 | |

OTHER PUBLICATIONS

Written Opinion dated Sep. 13, 2019 of International application No. PCT/EP2019/068683.

* cited by examiner

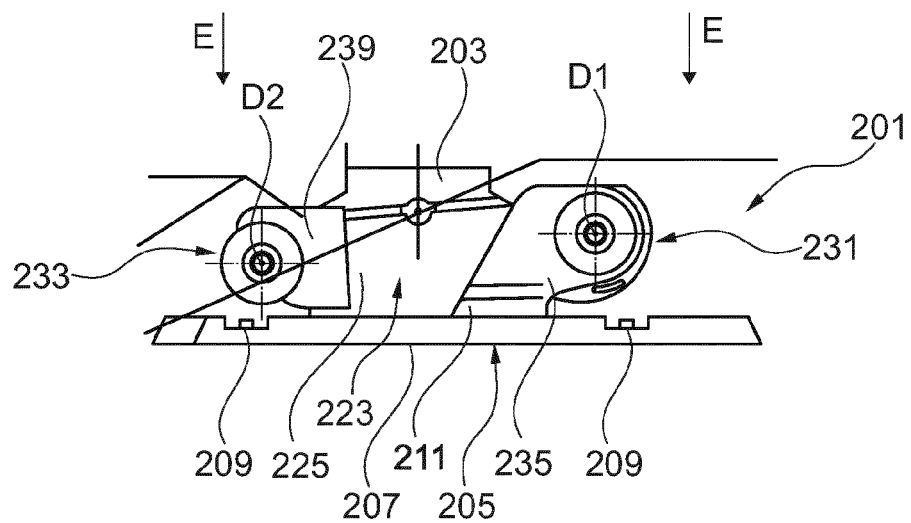
Fig. 14
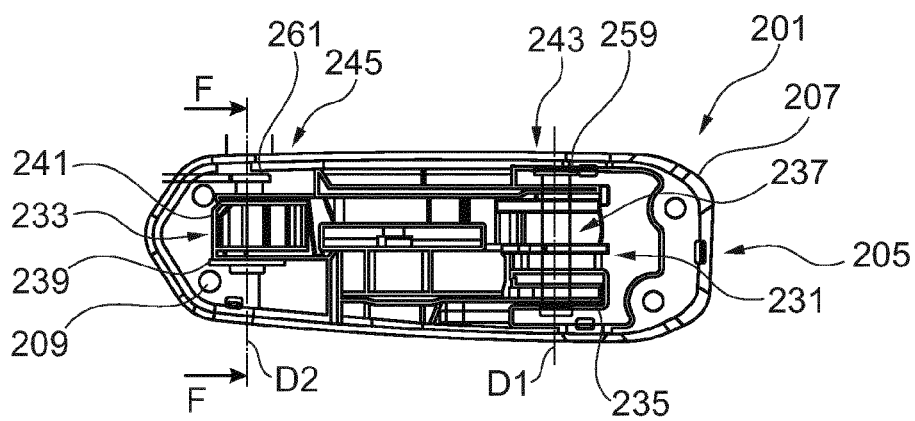
Fig. 15
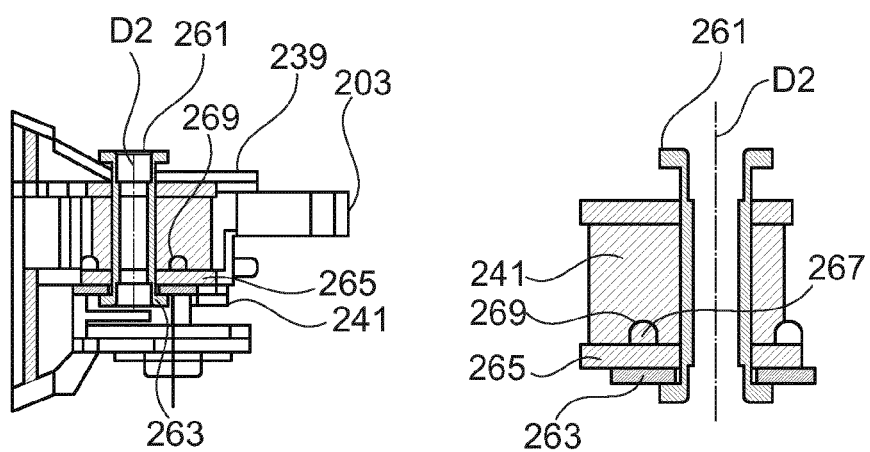
Fig. 16a
Fig. 16b

REAR VIEW DEVICE AND VEHICLE HAVING SUCH A REAR VIEW DEVICE

CROSS-REFERENCE TO RELATED PATENT APPLICATIONS

This application is a National Stage Entry of International Patent Application No. PCT/EP2019/068683, filed Jul. 11, 2019, which claims the benefit of priority to German Patent Application No. DE 10 2018 116 836.5, filed Jul. 11, 2018, each of which is hereby incorporated by reference in its entirety for all purposes.

BACKGROUND

1. Field of the Invention

The present invention relates to a rearview device for a vehicle, comprising at least one sensor for detecting information of the environment of the vehicle, wherein the rearview device is attachable to the support structure of the vehicle by means of at least a first fastening device, and to a vehicle comprising such a rearview device.

2. Related Art

Rearview devices in the form of exterior mirrors or interior mirrors are known from the prior art. Recently, especially in the context of efforts towards autonomous driving, more and more such rearview devices are designed as camera-based systems. Instead of a mirror, a sensor, in particular a camera, is used to record the area usually imaged by the mirror by means of the sensor and to display it to the driver or occupants of the vehicle by means of a display device, such as a monitor or display. In such camera-based systems, however, the sensor has a limited solid angle. This means that a plurality of sensors must be used to cover an area comparable to that of the rearview mirror, in particular to avoid blind spots. In addition, such camera-based systems cannot be easily retrofitted in vehicles known to date, or at least traditional rearview mirrors or rearview device systems cannot be replaced by a camera-based system at disproportionate expense.

It is therefore the task of the present invention to provide a rearview device that overcomes the disadvantages of the prior art, and in particular has an improved solid angle range and is further retrofittable, in particular to easily and inexpensively replace a traditional mirror-based rearview device at least in part.

According to the invention, this task is solved by the fact that the rearview device comprises at least one arm which is mounted by means of the first fastening device so as to be rotatable about at least one first axis of rotation, which has at least one vertical component, about at least one first pivot point for a first rotation.

It is particularly preferred that the sensor comprises at least one camera, at least one infrared sensor, at least one radar sensor, at least one ultrasonic sensor, at least one Lidar sensor, and/or at least one time of flight (TOF) sensor.

Also, the invention proposes that the environment of the vehicle with respect to a main driving direction of the vehicle comprises at least one side area, at least one rear area, at least one front area, and/or at least one interior area at least partially.

Furthermore, the invention proposes that the first fastening device comprises at least one fastening plate which has the pivot point and is at least indirectly operatively connected to the supporting structure.

Particularly preferred rearview devices can be characterized in that the arm can be transferred to at least one avoidance position and/or at least one operating position by means of a rotation about the first axis of rotation.

In the above embodiment, it is particularly preferred that the arm can be locked in the operating position by means of at least one retaining latch.

The two aforementioned embodiments can also be characterized by at least one first spring element, by means of which the arm is suitable to be forced into the avoidance position, at least one second spring element, by means of which the arm is suitable to be forced into the operating position, and/or at least one third spring element, preferably a pair of third spring elements, by means of which the arm is suitable to be held in the operating position.

Further, the invention proposes that the arm is connected to the first pivot via at least a first intermediate bearing, preferably the intermediate bearing being rotatable about the first pivot and/or the first axis of rotation during a movement of the arm from the operating position to the avoidance position and/or from the avoidance position to the operating position.

In this aforementioned embodiment, it is particularly preferred that the intermediate bearing enables a second rotation of the arm about at least one second axis of rotation, preferably spaced apart from the first axis of rotation and/or parallel to the first axis of rotation, and/or about a second point of rotation, in particular spaced apart from the first point of rotation.

Further, the invention proposes that the intermediate bearing comprises at least one lever element connecting the first pivot point and the second pivot point.

Also, a rearview device according to the invention can be characterized in that during the first rotation, in particular during a movement of the arm from the operating position into the avoidance position and vice versa, the intermediate bearing together with the arm is rotatable about the first axis of rotation, preferably a rotation of the arm about the second axis of rotation is omitted.

Furthermore, it is proposed with the invention that the arm is suited to be moved by means of the second rotation from the operating position into at least one parking position, preferably opposite to the avoidance position, and is preferably suited to be fixed in the parking position, in particular by means of at least one fourth spring element.

Furthermore, a rearview device according to the invention can be characterized by at least one first pivot bearing, preferably arranged at least regionally in the first pivot point and/or enabling rotation about the first pivot axis, and/or at least one second pivot bearing, preferably arranged at least regionally in the second pivot point and/or enabling rotation about the first pivot axis.

In this context, it is particularly preferred that the first pivot bearing comprises at least one first bearing element that is in operative connection with the fastening device, in particular is connected and/or fixed to the fastening device, and at least one second bearing element that is in operative connection with the arm and/or the intermediate bearing, in particular is connected and/or fixed to the arm and/or the intermediate bearing, and/or the second pivot bearing comprises at least one first bearing element operatively connected to the intermediate bearing, in particular connected and/or fixed to the intermediate bearing, and at least one second bearing element operatively connected to the arm, in particular connected and/or fixed to the arm, wherein in particular the first bearing element and/or the second bearing element is or are mounted eccentrically with respect to the first axis of rotation and/or the second axis of rotation.

In the two aforementioned embodiments, it is particularly preferred that the first pivot bearing and/or the second pivot bearing enables rotation about the first axis of rotation and/or the second axis of rotation continuously and/or in at least two, preferably a plurality of predefined steps.

Also, a rearview device according to the invention may be characterized in that the first pivot bearing and/or the second pivot bearing comprises at least one adjusting device, wherein the adjusting device comprises at least one locking device, at least one clamping device, at least one latching device and/or at least one fixing device.

In the aforementioned embodiment, it is particularly preferred that the adjusting device comprises at least one first engagement element securely connected to the first bearing element and at least one second engagement element securely connected to the second bearing element, wherein the first engagement element engages the second engagement element in at least one, preferably a plurality of, rotational positions or the second engagement element engages the first engagement element in at least one, preferably a plurality of, rotational positions.

It is also proposed with the invention that the first engagement element is movably mounted relative to the first bearing element and is biased by means of at least one first biasing element, in particular comprising at least one fifth spring element, in the direction of the second bearing element and/or the second engagement element and/or the second engagement element is movably mounted relative to the second bearing element and is biased by means of at least one second biasing element, in particular comprising at least one sixth spring element, in the direction of the first bearing element and/or the first engagement element.

The two aforementioned embodiments can be characterized in particular in that the first engagement element comprises at least one pin, at least one bolt, at least one protrusion and/or at least one locking ring and the second engagement element comprises at least two, preferably a plurality of receptacles, recesses and/or depressions formed complementarily to at least one region of the first engagement element, or the second engagement element comprises at least one pin, at least one bolt, at least one protrusion and/or at least one locking ring and the first engagement element comprises at least two, preferably a plurality of receptacles, recesses and/or depressions formed complementarily to at least one region of the first engagement element.

Further, the invention proposes that the first engagement element or the second engagement element is movably mounted for movement in a direction substantially perpendicular to the first axis of rotation and/or the second axis of rotation.

It is also proposed for the rearview device that the first engagement element comprises at least one locking pin, wherein the locking pin is suitable to be forced by means of the first biasing element into engagement with at least one slot comprising at least one recess, which is comprised by the second engagement element, or the second engagement element comprises at least one locking pin, wherein the locking pin is suitable to be forced by means of the second biasing element into engagement with at least one slot comprising at least one recess comprised by the first engagement element.

Furthermore, it is preferred that the first engagement element or the second engagement element is movably mounted for movement in a direction substantially parallel to the first axis of rotation and/or the second axis of rotation.

In the aforementioned embodiment, it is particularly preferred that the first engagement element is designed in the form of at least one locking ring, preferably having at least one protrusion, in particular a plurality of protrusions, wherein the locking ring is suited to be forced in the direction of the second engagement element by means of the first biasing element, preferably having at least one spring ring, in the direction of the second engagement element, or the second engagement element is designed in the form of at least one locking ring, preferably having at least one protrusion, in particular a plurality of protrusions, wherein the locking ring is suited to be forced in the direction of the first engagement element by means of the second biasing element, preferably having at least one spring ring.

For the aforementioned embodiment, it is particularly preferred that the locking ring and the first and/or second biasing element are supported by means of at least one axle element extending along the first axis of rotation or the second axis of rotation, preferably comprising at least one tubular rivet.

Particularly preferred embodiments provide that the first spring element, the second spring element, the third spring element, the fourth spring element, the fifth spring element and/or the sixth spring element comprises or comprise at least one tension spring, at least one compression spring, at least one spring ring and/or at least one shaped spring and/or the third spring element, the fourth spring element, the fifth spring element and/or the sixth spring element comprises at least one locking spring.

Furthermore, the invention proposes that the sensor is fixable to the arm by means of at least a second fixing device.

In the aforementioned embodiment, it is particularly preferred that the distance of the sensor with respect to the first pivot point and/or the second pivot point is suited to be changed by means of the second fastening device, in particular a radial position of the sensor along the arm with respect to the first pivot point and/or the second pivot point is suited to be changed, preferably continuously and/or in predefined steps.

Furthermore, the invention suggests that the second fastening device comprises at least one clamping device, at least one screwing device, at least one latching device, at least one magnetic connecting device, at least one adhesive device, and/or at least one tensioning device.

Finally, for the rearview device, it is proposed that the first rotation, the second rotation and/or the movement of the sensor along the arm and/or along the vehicle is achievable by means of at least one actuator, preferably during a movement of the vehicle.

Furthermore, the invention provides a vehicle comprising at least one rearview device according to the invention.

In the case of the vehicle, it is particularly preferred that the vehicle comprises the first fastening device, in particular a fastening plate, at least in some regions, wherein in particular by means of the fastening plate a conventional mirror, in particular exterior mirror, is suitable to be connected to the vehicle and the mirror is suitable to be replaced by the arm, in particular together with the intermediate bearing.

Also, finally, the invention proposes that the vehicle is at least regionally in the form of at least one motor vehicle, at least one motorcycle, at least one e-mobile, at least one truck, and/or at least one means of transport.

The invention is thus based on the surprising realization that a camera-based rearview system can be provided which makes it possible to convert conservative rearview systems, in which a mirror is used, to a camera-based or sensor-based rearview system in a simple and cost-effective manner, or also to replace such systems. In this context, the sensor-based system can be attached to the vehicle cabin on any vehicle version from the outside or inside by appropriate fastening means, such as fastening screws. In particular, the fastening devices already present on the vehicle, such as fastening plates, can be used.

The use of an arm in the rearview device further leads to the advantage that the area that can be viewed by the respective sensor can be increased, since the distance between the vehicle and the sensor can be increased.

At the same time, the rearview device according to the invention allows it to be adapted to the respective conditions, since the arm allows the sensor to be positioned in any position along the arm and orientation relative to the vehicle and the environment, i.e. the position of the sensor, in particular the camera can be freely selected and positioned on the arm. Preferably, the sensor or camera is mounted by means of a second mounting device, such as a clamping or screw system.

At the same time, the rearview device meets the corresponding safety standards, since the arm can be transferred from an operating position to a avoidance position by means of a first rotation about a first axis of rotation or a first pivot point, or to a parking position by means of a second rotation or a second axis of rotation about a second pivot point. This makes it possible to reduce the width of the vehicle in a parking situation by "folding" the arm against the vehicle. At the same time, the avoidance position ensures that if the arm comes into contact with an obstacle, the arm can fold down, in particular can be transferred to the avoidance position.

An arm in the sense of the invention is understood to be an element which, with respect to the first or second pivot point, has a greater extension in the radial direction than in the axial direction of the first axis of rotation or than in a direction perpendicular to the axial and radial directions.

The rearview device is thus designed in such a way that folding down can take place via a bearing or a first fastening device. Preferably, a two-axis bearing is implemented with the interposition of an intermediate bearing. Depending on the direction in which the rearview device folds down, i.e. swings out or folds in, a rotation is adopted via the first axis of rotation or the second axis of rotation.

The rearview device according to the invention can be equipped with various sensors. In addition to cameras, infrared sensors, ultrasonic sensors or radar sensors or time-of-flight (ToF) sensors can also be used. In particular, in the case in which various ambient areas of the vehicle can be detected by means of the sensor, it becomes possible to provide seamless monitoring of the vehicle's environment, in particular to provide a so-called 360° view of the vehicle. Preferably, when the arm is folded out into the operating position under the action of a retaining latch and a first spring element, such as a tension spring, the arm is held in the operating position, and/or can be forced by at least a second spring element. Preferably, the arm is also held in the operating position alternatively or additionally by means of at least one third spring element, in particular a tension spring and/or at least one locking spring.

Preferably, the movement from the parking position to the operating position, in which the sensor can detect the desired surrounding area of the vehicle, is then carried out manually by unfolding the rearview device.

As an alternative to the described rotation from the parking position and/or the avoidance position to the operating position, the movement can also be performed via an electric actuator. If an intermediate bearing is used, movement of the arm about a second pivot point is also possible. This ensures that the rearview device can be moved not only into an avoidance position, as in the case of a collision with an obstacle, but also into the parking position, which is preferably opposite the avoidance position with respect to the operating position.

By separating the first axis of rotation from the second axis of rotation, it is possible that different resistances can be realized when moving the arm into the avoidance position compared to the parking position. Preferably, the first pivot point and the second pivot point are locally separated from each other and during a rotation about the first pivot axis the position of the intermediate bearing relative to the arm is not changed, in particular no movement about the second pivot axis takes place.

Conversely, it is thus made possible that a movement about the second axis of rotation does not result in a movement about the first axis of rotation. In this way, it is possible for the arm to move both to the avoidance position and to the parking position in a minimum of space.

Overall, the rearview device according to the invention, in particular in its preferred embodiments, is characterized by the fact that in the case of the rearview device, a folding or unfolding movement, in particular from the operating position, can be carried out via two pivot points or axes, a predefined operating position can be achieved by means of a retaining latch, and it is possible to attach the rearview device to existing vehicles, in particular all common vehicle types can be equipped with a corresponding rearview device, even retroactively.

BRIEF DESCRIPTION OF THE DRAWINGS

Further features and advantages of the invention will be apparent from the following description, in which preferred embodiments of the invention are explained with reference to figures, wherein:

FIG. 14 is a schematic side view of a rearview device according to the invention in a fourth embodiment;

FIG. 15 is a schematic top view of the rearview device of FIG. 14 from direction E in FIG. 14;

FIG. 16a is a schematic cross-sectional view of a pivot bearing of the rearview device of FIG. 15 from direction F in FIG. 15;

FIG. 16b is a detailed view of the pivot bearing of FIG. 16a;

DETAILED DESCRIPTION

Figure 1:
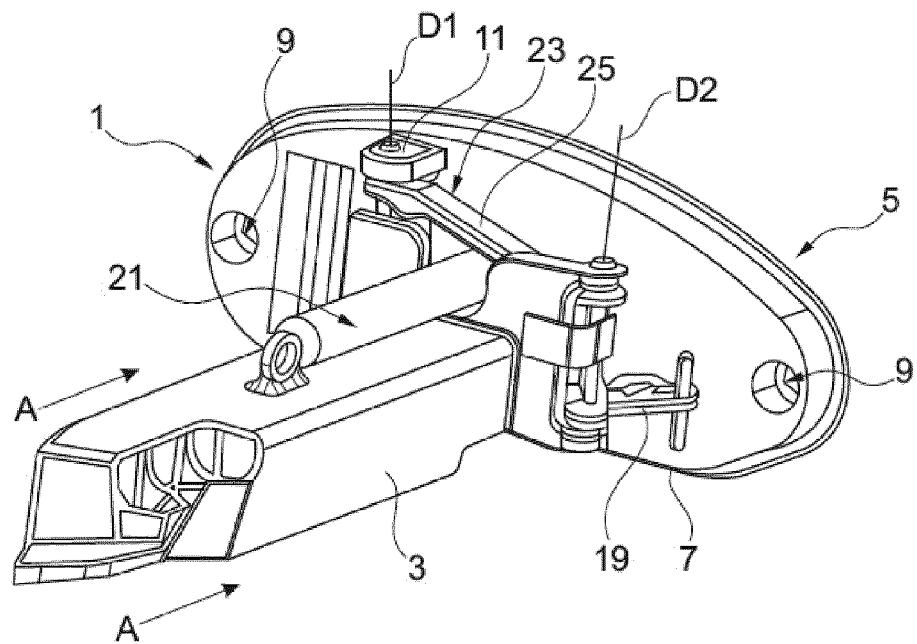
FIG. 1 is a perspective view of a rearview device according to the invention in a first embodiment.
Figure 2:
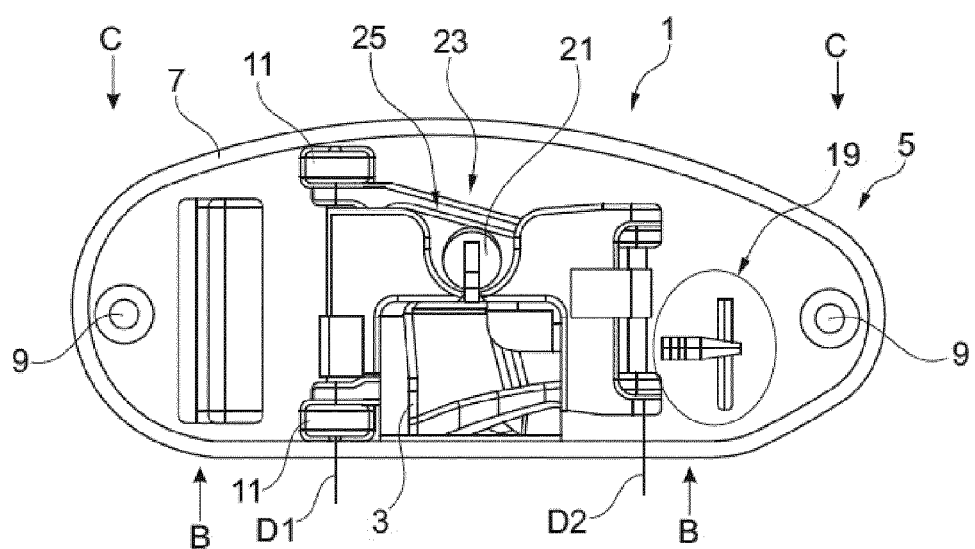
FIG. 2 is a top view from direction A in FIG. 1 of the rearview device of FIG. 1.

FIG. 1 shows a perspective view of a rearview device 1 of a first embodiment.

According to the invention, the rearview device 1 comprises an arm 3 and can be connected to a support structure of a vehicle by means of a first fastening device 5, which comprises a fastening plate 7. For this purpose, attachment points 9, with which the fastening plate 7 can be fastened to a supporting structure, for example by means of screws, are provided in particular in the fastening plate 7.

The fastening plate 7 further comprises bearing elements 11 by which a first axis of rotation D1 is fixed. As will be explained later, the bearing elements 11 define a first pivot point that allows the arm 3 to rotate about the pivot axis D1.

Figure 3:
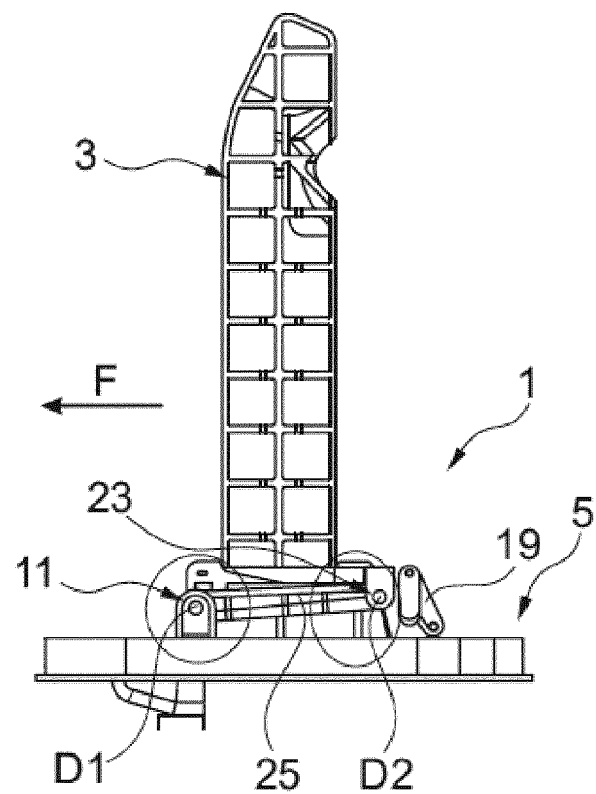
FIG. 3 is a top view of the rearview device of FIGS. 1 and 2 from direction B in FIG. 2.

The axis of rotation D1 is essentially vertical, which means in particular perpendicular to a main direction of travel F, as indicated in particular by an arrow in FIG. 3.

Figure 4:
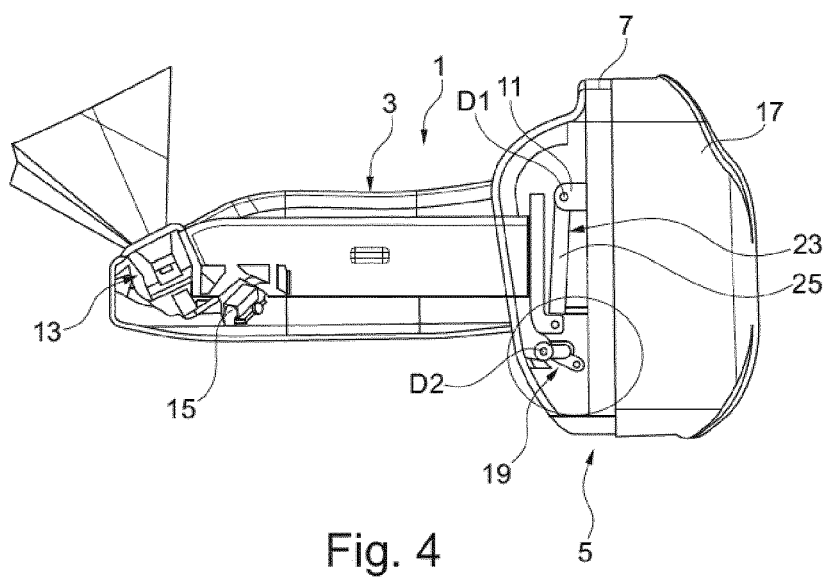
FIG. 4 is a top view of the rearview device of FIGS. 1 to 3 from direction C in FIG. 2.
Figure 5:
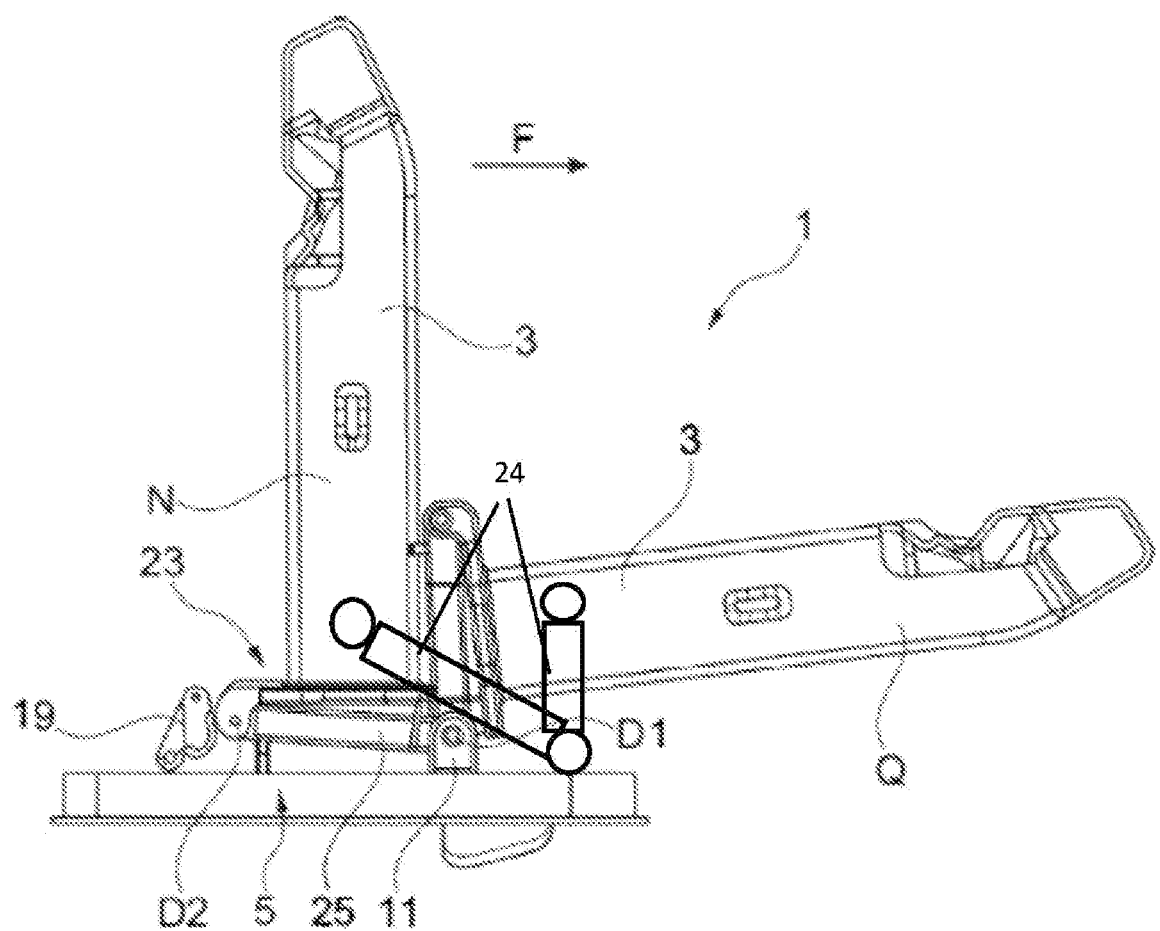
FIG. 5 is another top view of the rearview device of FIGS. 1 to 4 from direction C in FIG. 2 in an avoidance position.

As can be seen in particular from FIG. 4, sensors 13 and 15 are arranged in the area of the arm 3. The sensors 13 and 15 are each implemented as cameras or similar sensors for detecting parameters of the environment of the rearview device and make it possible to monitor the side area of the vehicle 17, which is indicated in FIG. 4.

In FIGS. 1 to 4, the rearview device 1 is shown in an operating position N. In this operating position N, the arm 3 is held by means of a retaining latch 19, which is shown in particular in FIGS. 2 and 3. This holding in the operating position N is supported by means of a tension spring 21, which is a second spring element. This second spring element forces the arm 3 into the operating position N and holds it in this position in cooperation with the retaining latch 19.

As will be explained below, rotation about the axis of rotation D1 enables the rearview device 1 to be transferred to an avoidance position Q. As will also be explained, the rotation around a rotation axis D2 enables the rearview device 1 to be transferred to a parking position (not shown).

Either by means of an actuator not shown, in particular an electric, electromagnetic, magnetic actuator and/or an actuator comprising at least one shape memory alloy element, or manually by a user of the vehicle, the rearview device 1 can be returned from both the parking position and the avoidance position Q to the operating position N shown in FIGS. 1 to 4.

The use of the arm 3 in the rearview device 1 offers the advantage that the cameras 13, 15 can be arranged at a certain distance from the support structure of the vehicle 17. This makes it possible that an improved angle in the area above the cameras 13, 15 can be covered compared to previously known camera-assisted rearview devices. Furthermore, this prevents, or at least reduces, the formation of blind spot areas and makes it possible to cover the entire surrounding area of the vehicle even using a small number of sensors or cameras.

In the parking position, the arm can now be "folded" against the vehicle 17, in particular the support structure of the vehicle, thus reducing the width of the vehicle, especially when parking or backing out. In doing so, however, the cameras 13 can still be used to monitor the surrounding area of the vehicle. For this purpose, it is provided in particular that the sensors 13, 15 are connected to the arm 3 via second fastening devices not shown. These second fastening devices make it possible for the sensors 13, 15 to be fastened essentially at any position of the arm 3, so as to enable the best possible detection of the surrounding area of the vehicle.

In particularly preferred embodiments, it is provided that the second fastening device allows the position of the sensors 13, 15 or their orientation to be changed. For example, during a parking process in which the arm 3 or the rearview device 1 is in the parking position, the orientation or position of the sensor 15 can be changed in such a way that a lower side area of the vehicle is detected in order to avoid a collision with obstacles located there. In this way, it can be prevented that a driver overlooks obstacles when parking or backing out.

Furthermore, in order to comply with safety regulations, it is necessary for the rearview device 1 to allow the arm 3 to deflect not only in the direction of the parking position but also in an opposite position in the event of contact of the vehicle with an obstacle, in particular in the deflecting position Q. For this purpose, the rearview device 1, in particular the first fastening device 5, comprises an intermediate bearing 23. The intermediate bearing 23 comprises a lifting element 25 which engages on a first side with the bearing elements 11 or in the first pivot point and is thus supported about the first axis of rotation D1. The arm 3 is then attached to the intermediate bearing 23 or the lever 25 via a second pivot point, which allows rotation about the second axis of rotation D2. In this way, a rotation of the arm 3 both about the first axis of rotation D1, and thus between the operating position N and the avoidance position Q, and about the second axis of rotation D2, and thus between the parking position and the operating position N, can be realized in a very small installation space.

If the arm 3 comes into contact with an object that is moving past the vehicle, in particular relative to the vehicle in the main direction of travel F, the arm 3 can execute a rotation about the first axis of rotation D1 via the first pivot point and in this way be transferred to an avoidance position Q. The arm 3 can be fixed in this avoidance position Q via a first spring element 24. In this evasive position Q, the arm 3 can be fixed via a first spring element that is not shown. After this deflection of the arm 3, the arm 3 can be manually transferred by a user back to the operating position N shown in FIGS. 1 to 4. If, on the other hand, the arm 3 is in the parking position, it can be fixed in this parking position via a fourth spring element 26.

The rearview device according to the invention thus makes it possible for it to be attached to vehicles of common types, in particular in exchange for previously used mirror-based rearview devices. The only prerequisite is that a first fastening device is present on the vehicle, which has corresponding bearing elements 11. These enable the arm 3 together with the corresponding spring elements to be attached to the vehicle. At the same time, the rearview device according to the invention offers the possibility of being able to better monitor the bypass area of the vehicle compared to previously known camera-based rearview devices due to the increased distance of the respective sensors from the supporting structure of the vehicle. At the same time, however, the safety aspects are not compromised in that the rearview device allows the arm to swerve into the appropriate avoidance or parking position.

Figure 6:
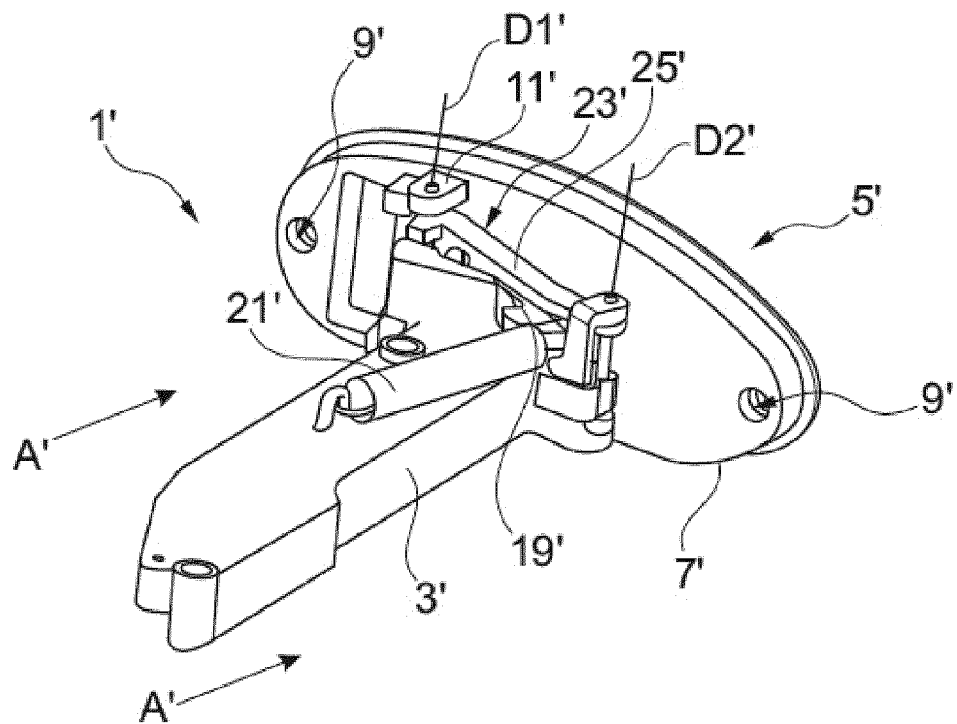
FIG. 6 is a perspective top view of a rearview device according to the invention in a second embodiment.

FIG. 6 shows a perspective view of a rearview device 1' according to the invention in a second embodiment. Elements of the second embodiment of the rearview device 1' which functionally correspond to the greatest possible extent to those of the first embodiment of the rearview device 1 are provided with the same, but simply deleted reference signs. Since the functionality of the second embodiment of the rearview device 1' is largely corresponding to that of the rearview device 1 of the first embodiment, only the figures of the second embodiment are briefly presented below. With regard to the further explanations, the explanations given for FIGS. 1 to 5 also apply to this embodiment.

Figure 7:
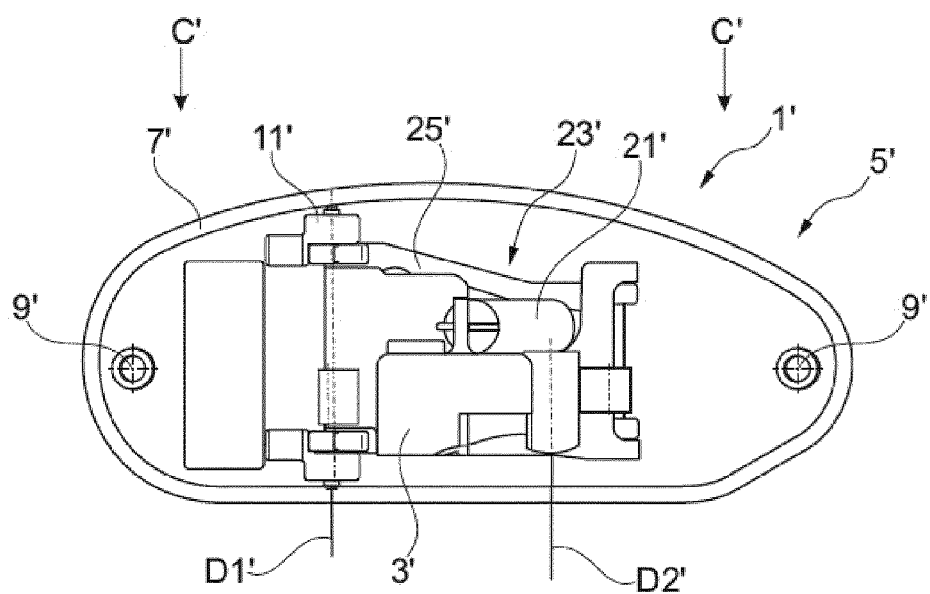
FIG. 7 is a top view from direction A' in FIG. 6 of the rearview device of FIG. 6.
Figure 8:
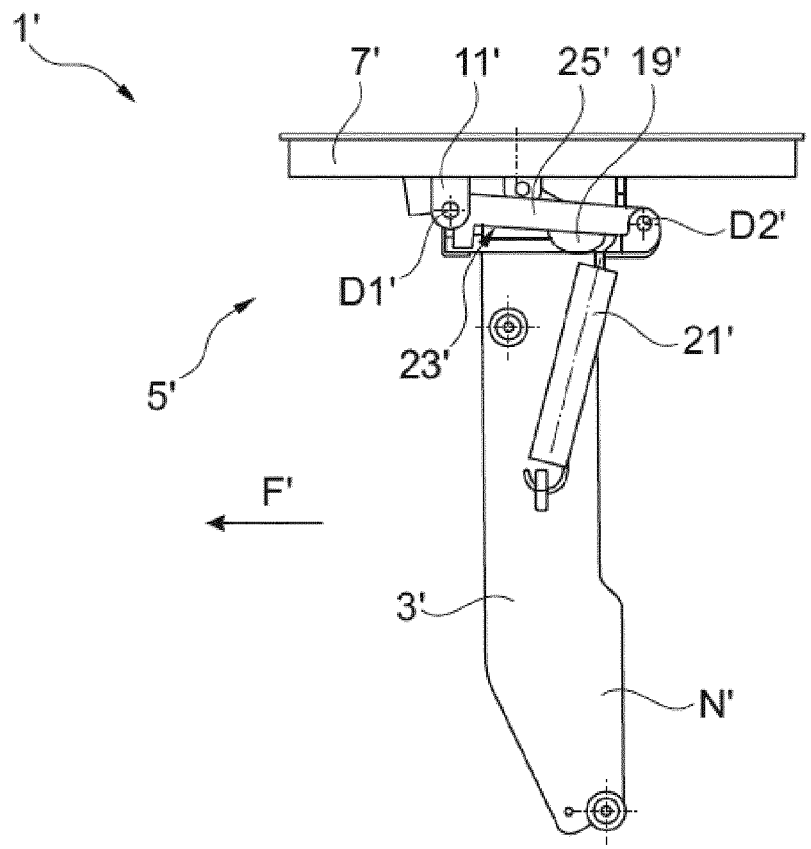
FIG. 8 is a top view of the rearview device of FIGS. 6 and 7 from direction C' in FIG. 7 in an operating position.

Furthermore, FIG. 7 shows a top view from direction A' in FIG. 6 of the rearview device of FIG. 6, and FIG. 8 shows a top view from direction C' in FIG. 7 of the rearview device of FIGS. 6 and 7.

In FIGS. 6 and 7 as well as in FIG. 8, the rearview device 1' is shown in an operating position N', in which an arm 3' is held by means of a retaining latch 19', supported by a tension spring 21' acting as a second spring element. It is obvious that in comparison to the first embodiment, in the second embodiment, at least as long as the arm 3' is in the operating position N', the retaining latch 19' is now arranged between the two axes of rotation D1' and D2'.

Figure 9:
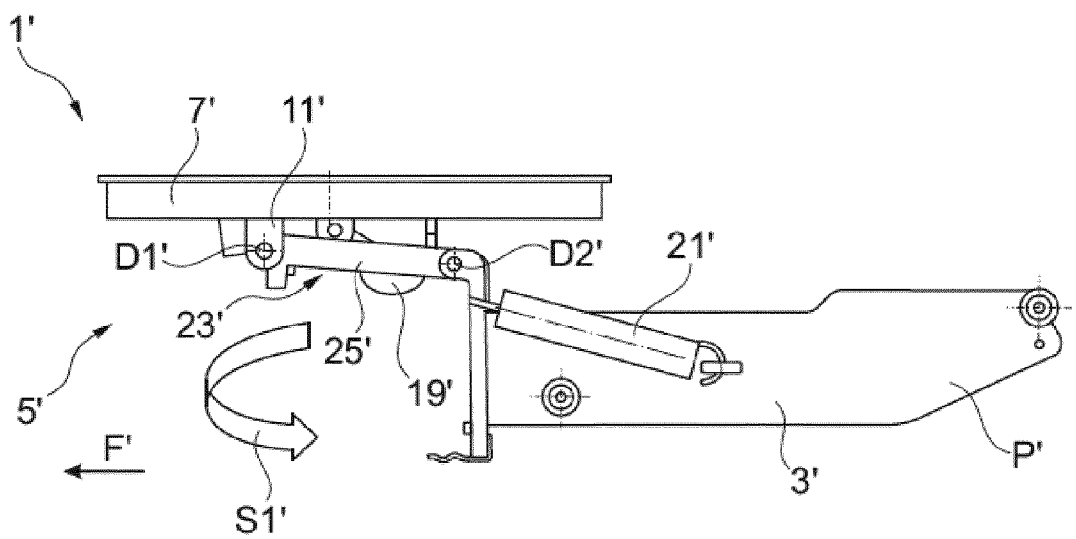
FIG. 9 is a top view of the rearview device of FIGS. 6 to 8 from direction C' in FIG. 7 in a parking position.

In FIG. 9, a top view of the rearview device 1' of FIGS. 6 to 8 from direction C' in FIG. 7 is shown in a parking position P'. In order to transfer the rearview device 1' from the operating position N' to this parking position P', the arm 3' is rotated about the axis of rotation D2', which is to be illustrated by an arrow S1', whereby a folding of the rearview device 1' is achieved.

Figure 10:
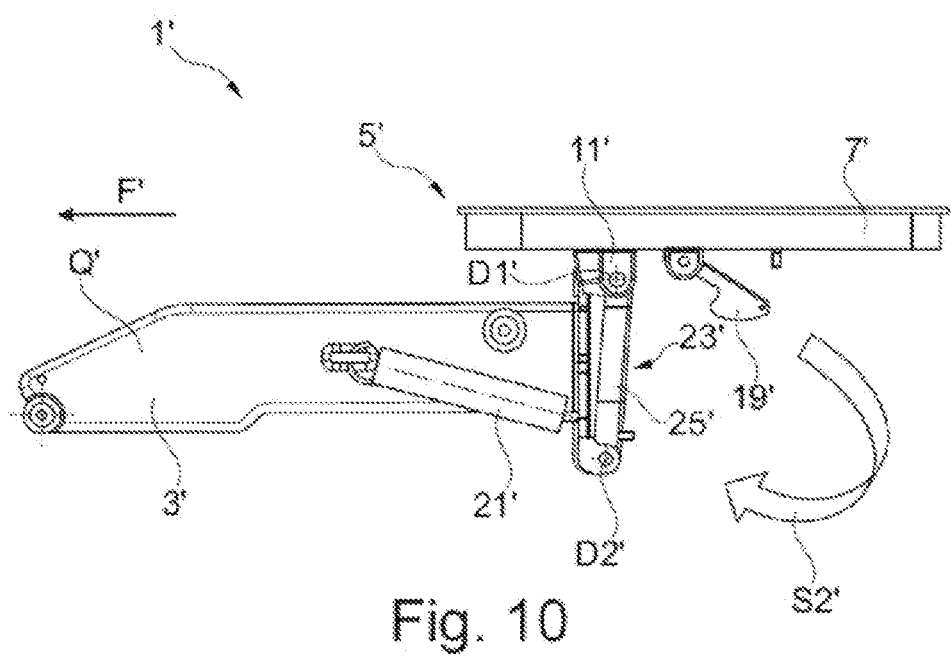
FIG. 10 is a top view of the rearview device of FIGS. 6 to 9 from direction C' in FIG. 7 in a avoidance position.

In FIG. 10, a top view of the rearview device 1' of FIGS. 6 to 9 from direction C' in FIG. 7 is shown in an alternative position Q'. In order to transfer the rearview device 1' from the operating position N' to this avoidance position Q', the arm 3' is rotated about the axis of rotation D1', which is to be illustrated by an arrow S2', whereby a folding down of the rearview device 1' is achieved.

Figure 11:
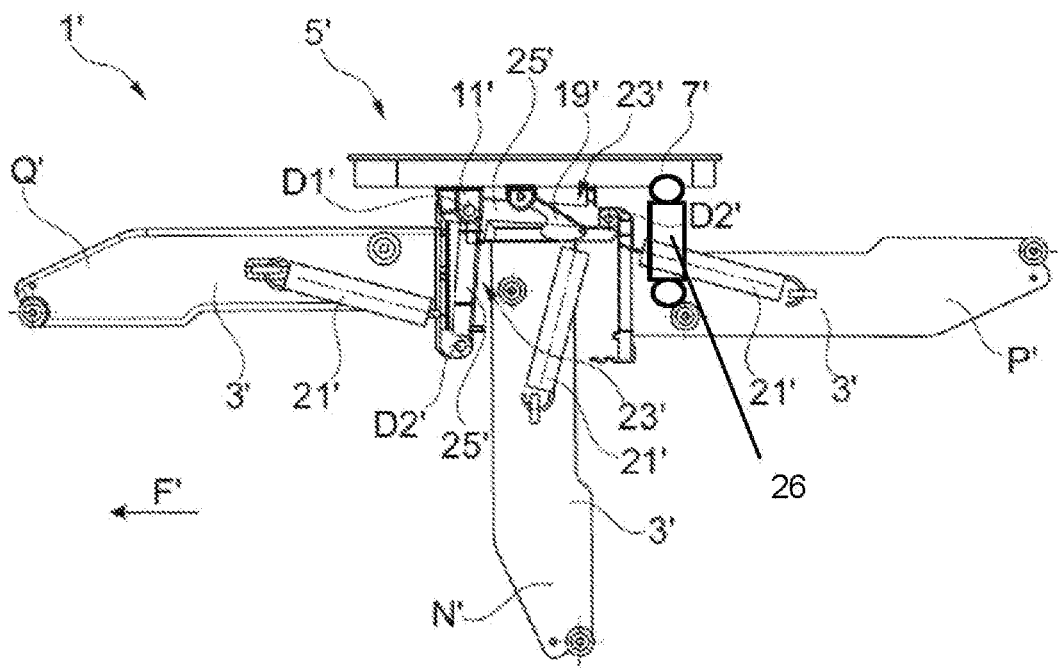
FIG. 11 is a top view of the rearview device of FIGS. 6 to 10 from direction C' in FIG. 7 with the operating, parking and avoidance positions shown simultaneously.

FIG. 11 shows a top view of the rearview device 1' of FIGS. 6 to 10 from direction C' in FIG. 7 with the operating, parking and avoidance positions N', P', Q' of the rearview device 1' shown simultaneously. It goes without saying that the rearview device 1' can only be in one of these three positions at a point in time under consideration. In this respect, the representation chosen in FIG. 11 serves only to illustrate the individual positions and to show them comparatively.

Figure 12:
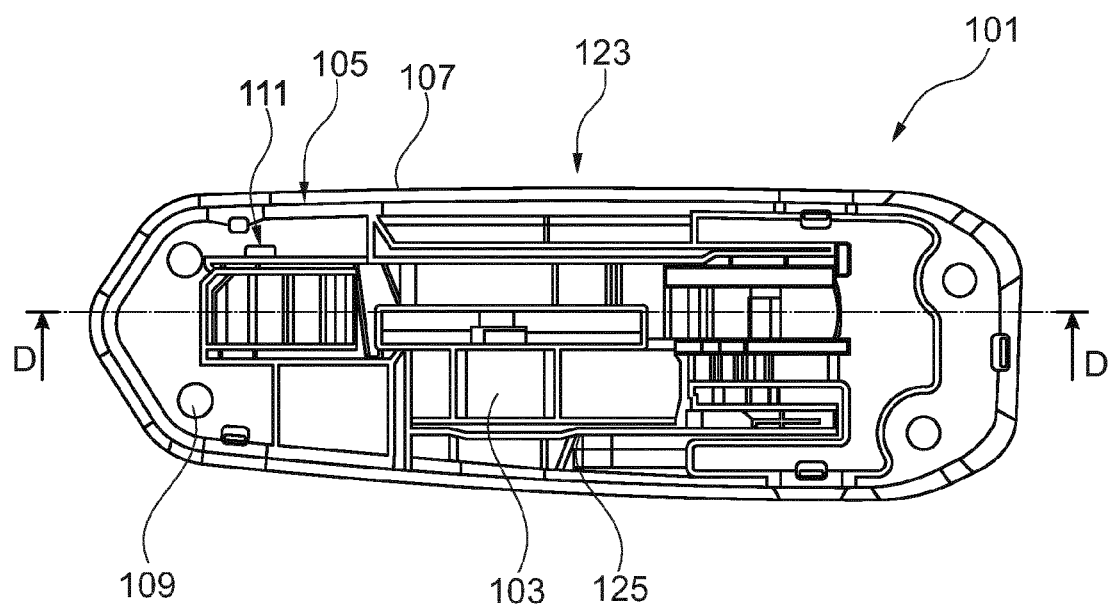
FIG. 12 is a top view of a rearview device according to the invention in a third embodiment.

FIG. 12 shows a schematic top view of a third embodiment of a rearview device 101 according to the invention. Those elements of the rearview device 101 which correspond to those of the rearview device 1 bear the same reference signs, but increased by 100.

Compared to the rearview device 1, an alternative embodiment was chosen to fix the arm 103 in the respective parking position, avoidance position or operating position. In particular, a compression spring, such as compression spring 21, was not used to fix or hold arm 103 in the operating position as shown in FIGS. 12 and 13.

Figure 13:
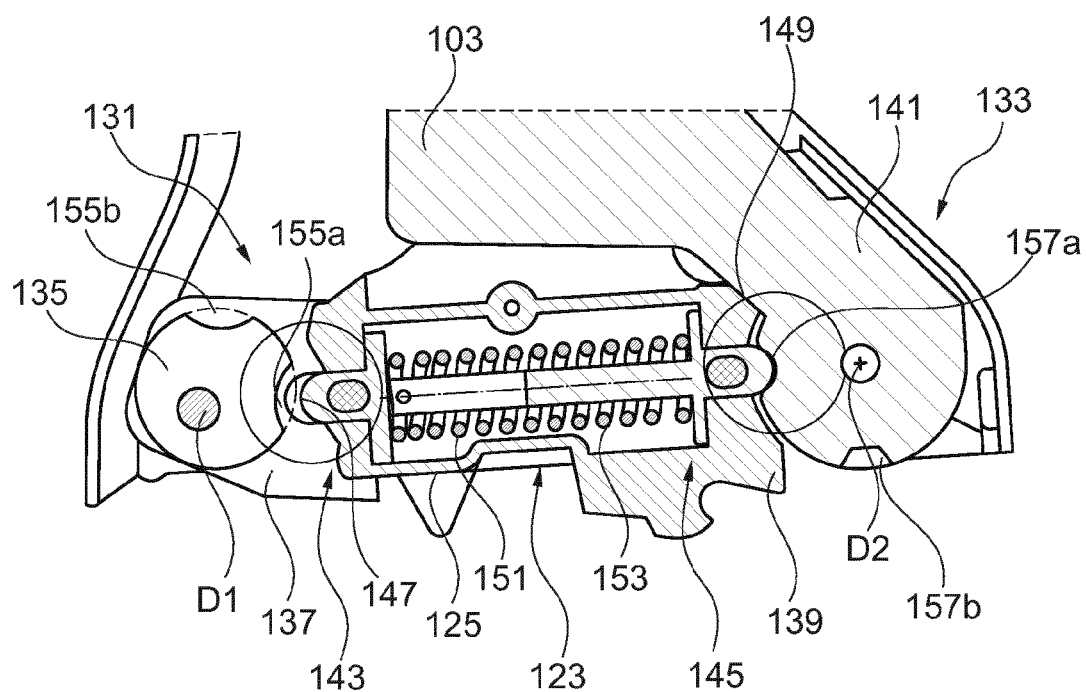
FIG. 13 is a schematic cross-sectional view of the rearview device of FIG. 12 from direction D in FIG. 12.

As can be seen in particular from FIG. 13, a first pivot bearing 131 is arranged in the area of the axis of rotation D1. A second pivot bearing 133 is arranged in the area of the second axis of rotation D2.

The respective pivot bearings 131 and 133 have respective first and second bearing elements. A first bearing element 135 of the first pivot bearing 131 is connected to the first pivot axis D1 in such a way that rotation of the first bearing element 135 about the pivot axis D1 is not possible. Furthermore, the first pivot bearing 131 has a second bearing element 137. This second bearing element 137 is in particular connected to the lever 125 of the intermediate bearing 123, is in particular formed integrally therewith or is fixed therein.

In contrast, in the second pivot bearing 133, a first bearing element 139, which is connected to the lever 125, in particular is formed integrally therewith, is fixed with respect to the axis of rotation D2, while a second bearing element 141 of the second pivot bearing 133 is formed integrally with the arm 103 and is thus mounted rotatably about the second axis of rotation D2.

Both the first pivot bearing 131 and the second pivot bearing 133 have respective adjustment devices in the form of locking devices 143 and 145. The respective locking devices 143 and 145 have a first engagement element 147 and 149, respectively. Both engagement elements 147 and 149 are formed as locking pins, which are preloaded by preloading elements in the form of springs 151 and 153, respectively. The springs 151 and 153 can also be formed in one piece.

In addition, the engagement elements 147, 149 are mounted for movement in a direction perpendicular to the axes of rotation D1 and D2, and in particular can be deflected from the position shown in FIG. 13 against the force of the spring 151, 153.

In the position shown in FIG. 13, the locking pin 147 engages a second engagement element in the form of a recess 155a formed on the linkage of the bearing element 135. As can be seen from FIG. 13, when the lever 125 is rotated about the first axis of rotation D1, the locking pin 147 is guided so that it is deflected from the position shown in FIG. 13 against the force of the spring 151 and thus disengages from the recess 155a. This then allows the lever 125 to continue to move counterclockwise about the axis of rotation D1 in FIG. 13 until the locking pin 147 engages the recess 155b, forcing the locking pin 147 into the recess 155b due to the force of the spring element 151. In this position, the position of the lever 125 relative to the first axis of rotation D1 is thus fixed.

Similarly, the second pivot bearing 133 has recesses 157a, 157b formed on the bearing element 141. If the arm 103 is deflected relative to the lever 125 in such a way that it is rotated about the axis of rotation D2, a force must first be applied to deflect the locking pin 149 against the force of the spring 153 from the position shown in FIG. 13. Once the engagement between the indexing pin 149 and the recess 157a is disengaged, the arm 103 can be rotated further about the axis of rotation D2 until the indexing pin 149 engages the recess 157b. In this position, the arm 103 is correspondingly fixed via the adjustment device comprising the locking bolt 149.

Compared to the rearview device 1, a spring element such as the compression spring 21 for fixing the arm 3 can thus be dispensed with. The corresponding fixing is effected via the corresponding locking device 143, 145. The advantage is that the movement of the lever 125 or the movement of the arm 103 after leaving the respective locking position in which the respective locking pin engages in the respective recess is possible without additional force. Furthermore, the construction volume is reduced and it is possible to integrate the locking device 143, 145 into the intermediate bearing 123, where it is correspondingly better protected against external influences.

In FIGS. 14 to 17b, a fourth embodiment of a rearview device 201 according to the invention is shown. Those elements of the rearview device 201 which correspond to those of the rearview device 1 and 101, respectively, bear the same reference signs, but increased by 200 and 100, respectively.

The rearview device 201 also includes a first pivot bearing 231, by means of which a lever 225 of an intermediate bearing 223 is mounted on the mounting device 205 so as to be rotatable about an axis of rotation D1 via a bearing element 211. In addition, rotation of an arm 203 relative to the lever 225 about a second axis of rotation D2 is possible by means of a second pivot bearing 233.

The first pivot bearing 231 includes a first bearing element 235 connected to the fastening plate 207. The first bearing element 235 is bifurcated, such that a second bearing element 237 is disposed between the bifurcated arms of the first bearing element 235. Similarly, the second pivot bearing 233 includes a first bifurcated bearing element 239 and a second bearing element 241 disposed between the forks of the bearing element 239.

In contrast to the rearview device 101, in the rearview device 201 corresponding locking devices 243 and 245 are designed in such a way that a movement of corresponding engagement elements takes place parallel to the respective axes of rotation D1 and D2. For this purpose, tubular rivets 259 and 261 are arranged in the region of the respective pivot bearings 231, 233. The tubular rivets 259 and 261 form the corresponding axes of rotation for the corresponding bearing elements.

The operation of the second pivot bearing 233 is described in more detail below with reference to FIGS. 16a to 17b, where the first pivot bearing 231 has an analogous structure.

Figure 17A:
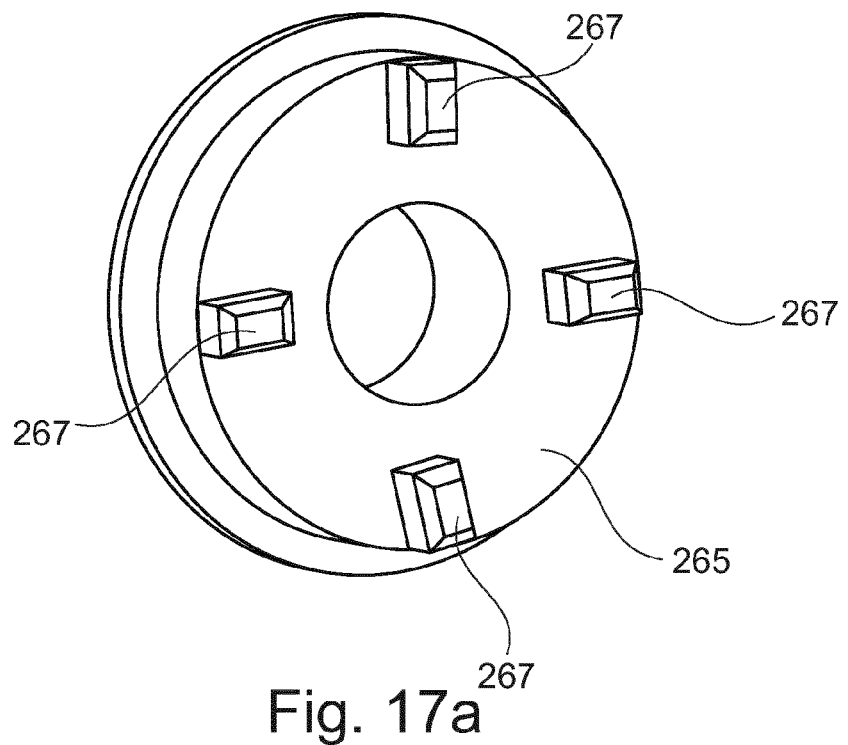
FIG. 17a is a locking ring inserted in the rearview device of FIGS. 14 to 16b.
Figure 17B:
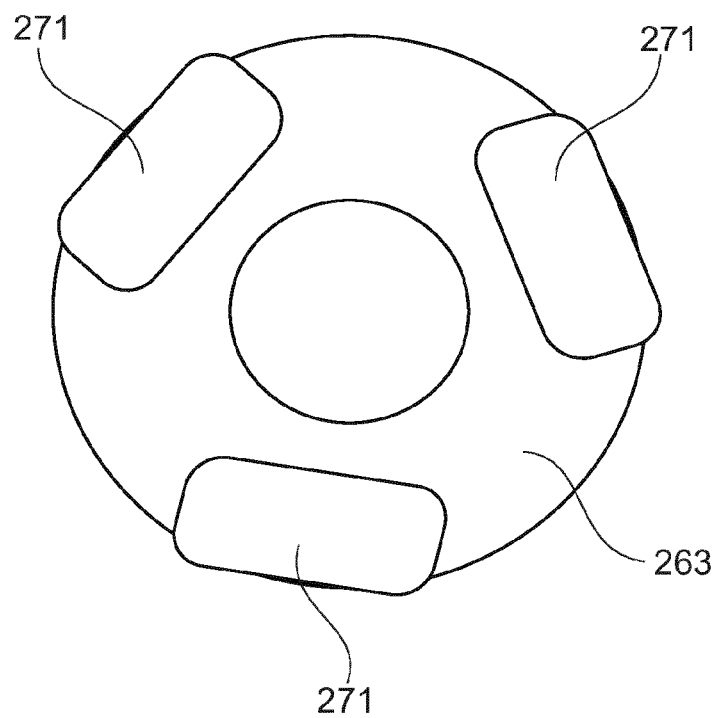
FIG. 17b is a schematic top view of a spring ring inserted in the rearview device of FIGS. 14 to 16b.

As can be seen in FIG. 16a, the tubular rivet 261 passes through the bearing elements 239 as well as the bearing element 241. Furthermore, a spring ring 263 shown in more detail in FIG. 17b is arranged between the bearing elements 239 on the tubular rivet 261. The spring ring 263 causes a locking ring 265 shown in more detail in FIG. 17a to be forced in the direction of the bearing element 241 along the axis of rotation D2.

If rotation of the arm 203 relative to the lever 225 now occurs, the following happens. As can be seen from FIG. 17a, the locking ring 265 has protrusions 267. In the position shown in FIG. 16a, the protrusions 267 engage corresponding recesses 269 formed in the bearing element 241. The rotation deflects the locking ring 265 against the spring force built up via spring elements 271 of the spring ring 263 in such a way that the locking ring 265 lifts off the bearing element 241 in the area outside the protrusion 267. Further rotation of the arm 203 about the lever 225 rotates the bearing element 241 about the axis of rotation D2 to such an extent that the protrusions 267 come into overlap with further depressions 269. In this position, the spring elements 271 cause the locking ring 265 to be forced in the direction of the bearing element 241, causing the protrusion 267 to engage the recess 269 so that the arm 203 is fixed or secured relative to the lever 225.

As can be seen in particular from FIG. 16b, the bearing element 241 is mounted eccentrically on the axis of rotation D2. This makes it possible to arrange the depressions 269 on the second bearing element 241 in such a way that, in the respective position, the four protrusion 267 come into overlap with four depressions 269, but the same depressions 269 are not necessarily engaged by the protrusions 267 during a rotation of 90 degrees. Thus, the depressions 269 can be distributed asymmetrically over the slotted link of the bearing element 241 and thus different locking positions of the arm 203 can be realized at any angles, for example an operating position, a parking position and an avoidance position, each of which can be secured with up to four engagements of the protrusions in respective depressions.

The fourth embodiment makes it possible in particular to improve the latching in the respective positions and to optimize the installation space. Also, latching and retaining forces can be better matched. In this case, two independent latching devices act on the respective pivot bearings, and the plurality of latching elements means that high locking safeties can be achieved.

The features disclosed in the foregoing description, in the figures and in the claims may be essential to the invention in its various embodiments, either individually or in any combination.

LIST OF REFERENCE SIGNS 1, 1', 101, 201 Rearview device
3, 3', 103, 203 Arm
5, 5', 105, 205 Fastening device
7, 7', 107, 207 Fastening plate
9, 9', 109, 209 Attachment point
11, 11', 111, 211 Bearing element
13 Sensor
15 Sensor
17 Vehicle
19, 19' Retaining latch
21, 21' Tension spring
23, 23', 123, 233 intermediate bearing
25, 25', 125, 225 Lever
131, 231 Pivot bearing
133, 233 Pivot bearing
135, 235 Bearing element
137, 237 Bearing element
139, 239 Bearing element
141, 241 Bearing element
143, 243 Locking device
145, 245 Locking device
147 Engagement element
149 Engagement element
151 Spring
153 Spring
155a, 155b Recess
157a, 157b Recess
259 Tubular rivet
261 Tubular rivet
263 Spring ring
265 Locking ring
267 Protrusion
269 Recess
271 Spring element
A, A' Direction
B, Direction
C, C' Direction
D Direction
E Direction
F Direction
D1, D1' Rotation axis D2, D2' Rotation axis
F, F' Main direction of travel
P' Parking position
Q, Q' Alternative position
N, N' Operating position
S1', S2' Direction of rotation

What is claimed is:

1. A rearview device for a vehicle comprising:
a sensor for detecting information on an environment of the vehicle; and
an arm;
a first pivot bearing configured to be arranged at least partially in the first pivot point or enabling rotation about a first axis of rotation;
a second pivot bearing configured to be arranged at least partially in a second pivot point or enabling rotation about a second axis of rotation;
wherein the rearview device is attachable to a supporting structure of the vehicle by at least one first fastening device;
wherein the arm is rotatably mounted by the first fastening device about a first axis of rotation that has a vertical component about a first pivot point for a first rotation;
wherein at least one of the first pivot bearing or the second pivot bearing includes an adjusting device;
wherein the adjusting device includes one of a locking device, a clamping device, a device or a fixing device;
wherein the adjusting device includes a first engagement element securely connected to the first bearing element and a second engagement element securely connected to the second bearing element, and wherein the first engagement element engages the second engagement element in at least one of rotational positions or the second engagement element engages the first engagement element in at least one rotational position.

2. The rearview device according to claim 1, wherein at least one of:
the first engagement element is movably mounted relative to the first bearing element and is biased by at least one first biasing element which is comprising at least a fifth spring element, in at least one of the direction of the second bearing element or the second engagement element, and
the second engagement element is mounted movably relative to the second bearing element and is biased by means of at least one second biasing element which is comprising at least a sixth spring element, in the direction of at least one of the first bearing element or the first engagement element.

3. The rearview device according to claim 1, wherein the first engagement element comprises at least one pin, at least one bolt, at least one protrusion and/or at least one locking ring, and the second engagement element comprises at least two receptacles, recesses and/or depressions formed complementary to at least one region of the first engagement element, or
the second engagement element comprises at least one pin, at least one bolt, at least one protrusion and/or at least one locking ring, and the first engagement element comprises at least two receptacles, recesses and/or depressions formed complementarily to at least one region of the first engagement element.

4. The rearview device according to claim 2, wherein the first engagement element or the second engagement element is movably mounted for movement in a direction substantially perpendicular to the first axis of rotation and/or the second axis of rotation.

5. The rearview device according to claim 4, wherein the first engagement element comprises at least one locking pin, wherein the locking pin is suitable to be forced by the first biasing element into engagement with at least one slot comprising at least one recess comprised by the second engagement element, or
the second engagement element comprises at least one locking pin, wherein the locking pin is suitable to be forced by the second biasing element into engagement with at least one slot comprising at least one recess comprised by the first engagement element.

6. The rearview device according to claim 2, wherein the first engagement element or the second engagement element is movably mounted for movement in a direction substantially parallel to the first axis of rotation and/or the second axis of rotation.

7. The rearview device according to claim 6, wherein the first engagement element is designed in the form of at least one locking ring having at least one protrusion, wherein the locking ring is suited to be forced in the direction of the second engagement element by means of the first biasing element having at least one spring ring in the direction of the second engagement element, or
the second engagement element is designed in the form of at least one locking ring having at least one protrusion wherein the locking ring is suited to be forced in the direction of the first engagement element by means of the second biasing element, preferably having at least one spring ring.

8. The rearview device according to claim 6, wherein the locking ring and the first and/or second biasing element are supported by at least one axle element extending along the first axis of rotation or the second axis of rotation and which comprises at least one tubular rivet.

9. A rearview device for a vehicle, comprising:
a fastening device configured to be affixed to a supporting structure of the vehicle, the fastening device having a first axial member;
a lever configured to be pivotally mounted to the fastening device at a first pivot including the first axial member such that the lever pivots between a first operational position and a second avoidance position;
an arm having a base portion and an elongated portion, the elongated portion being substantially perpendicular to the base portion and extending away from the base portion;
wherein the base portion includes a first end and a second end,
wherein the first end of the base portion is configured to be pivotally mounted to a distal end of the lever at a second pivot, the second pivot including a second axial member such that the arm is configured to pivot between the first operational position and a third parking position;
wherein the first pivot also includes a proximate end of the lever; and
wherein the base portion configured to be substantially perpendicular to the fastening device when the arm is in one of the first avoidance position or the third parking position; and
wherein the base portion configured to be substantially parallel to the fastening device when the arm is in the second operational position.

10. The rearview device according to claim 9, wherein the arm is configured to house one of a camera, an infrared sensor, a radar sensor, an ultrasonic sensor, a Lidar sensor, or a time of flight (TOF) sensor.

11. The rearview device according to claim 9, wherein the environment of the vehicle with respect to a main driving direction of the vehicle comprises one or more of at least one side area, at least one rear area, at least one front area, and at least one interior area at least partially.

12. The rearview device according to claim 9, wherein the fastening device includes a fastening plate and the first axial member.

13. The rearview device according to claim 9, wherein the arm is configured to be locked in the second operating position by a retaining latch.

14. The rearview device according to claim 9, further comprising:
a first spring element by which the arm can be forced into the avoidance position; and
a fourth spring element by which the arm can be forced into the parking position.

15. The rearview device according to claim 9, wherein, during a movement of the arm between the operating position and the avoidance position the lever together with the arm are configured to rotate about the first axis of rotation and the arm is configured to stay rotationally fixed relative to the lever.

16. The rearview device according to claim 9, wherein the lever is configured to remain rotationally fixed relative to the fastening device and the arm is configured to rotate relative to the lever at the second pivot when the arm moved between the second operating position and the third parking position.

17. The rearview device according to claim 9, wherein the first pivot includes a recess defined in one of the proximate end of the lever or the first axial member of the fastening device and a protrusion defined in the other of the proximate end of the lever and the first axial member of the fastening device; and
wherein the second pivot includes a recess defined in one of the distal end of the lever and the first end of the base portion of the arm and a protrusion defined in the other of the distal end of the lever and the first end of the base portion of the arm.

18. The rearview device according to claim 9 wherein the first axial member of the fastening device further includes a first collar defining the recess; and
wherein the first end of the base portion includes a second axial member having a second collar configured to be rotationally fixed to the second axial member such that the second collar defines the recess in the first end of the base portion.

19. The rearview device according to claim 9, wherein the first pivot includes a first collar rotationally fixed to the fastening device, and a second collar rotationally fixed to the lever; and
wherein the second pivot includes a first engagement collar rotationally fixed to the lever, and a second engagement collar rotationally fixed to the arm;
wherein the lever is configured to rotate relative to the fastening device; and
wherein the arm and the lever are configured to rotate relative to each other.

20. The rearview device according to claim 19, wherein at least one of the first collar or the second collar is mounted eccentrically with respect to the first axis of rotation; and
wherein at least one of the first engagement collar or the second engagement collar is mounted eccentrically with respect to the second axis of rotation.

21. The rearview device of claim 19, wherein the first collar further includes a protrusion, and the second collar includes at least two recesses wherein each recess is configured to receive the protrusion; and
wherein the engaging member includes a protrusion and the receiving member defines at least two recesses configured to receive the protrusion.

22. The rearview device of claim 21, wherein each protrusion is configured to move in a direction substantially perpendicular to one of the first axis of rotation or the second axis of rotation.

23. The rearview device of claim 21, wherein the protrusion of the first collar includes a movable locking pin, wherein a first biasing member is configured to urge the movable locking pin into engagement with the recess defined by the second collar; and
wherein the protrusion of the engaging member includes a movable locking pin, wherein a second biasing member is configured to urge the movable locking pin into engagement with a recess defined by the receiving member.

24. The rearview device of claim 19, wherein one of the first collar or the second collar is a locking ring having a protrusion, wherein the other of the first collar or the second collar is urged towards the locking ring by a spring ring; and
wherein one of the first engagement collar or the second engagement collar is a locking ring having a protrusion, wherein the other of the first collar or the second collar is urged towards the locking ring by a spring ring.

25. The rearview device of claim 9 further comprising a resilient biasing member is a tension spring configured to urge the arm to remain in the operational position.

26. The rearview device of claim 9, wherein each of the first axial member and the second axial member is a rivet.

27. The rearview device according to claim 9, wherein the arm is configured to house a sensor and the sensor is configured to be movably affixed to the arm such that a distance of the sensor with respect to one or both of the first pivot point and the second pivot point can be adjusted.

28. A vehicle comprising:
a rearview device further including
a fastening device configured to be affixed to a supporting structure of the vehicle, the fastening device having a first axial member;
a lever configured to be pivotally mounted to the fastening device at a first pivot including the first axial member such that the lever pivots between a first operational position and a second avoidance position;
an arm having a base portion and an elongated portion integral to the base portion, the elongated portion being substantially perpendicular to the base portion;
wherein the base portion includes a first end and a second end;
wherein the first end of the base portion is configured to be pivotally mounted to the lever at a second pivot, the second pivot including a second axial member such that the base portion is configured to pivots between the first operational position and a third parking position; and
wherein the first pivot includes a proximate end of the lever and the first axial member of the fastening device.

29. The vehicle according to claim 28, wherein the fastening device includes a fastening plate configured to support one of a conventional exterior mirror or the lever and the arm, the arm being pivotally connected to the lever.

30. The vehicle according to claim 28, wherein the vehicle is one of a motor vehicle, a motorcycle, or an e-mobile.

\* \* \* \* \*